Feb. 15, 1966  L. L. MARTINEZ  3,234,615
TENSIONAL CONNECTOR
Filed Feb. 25, 1963
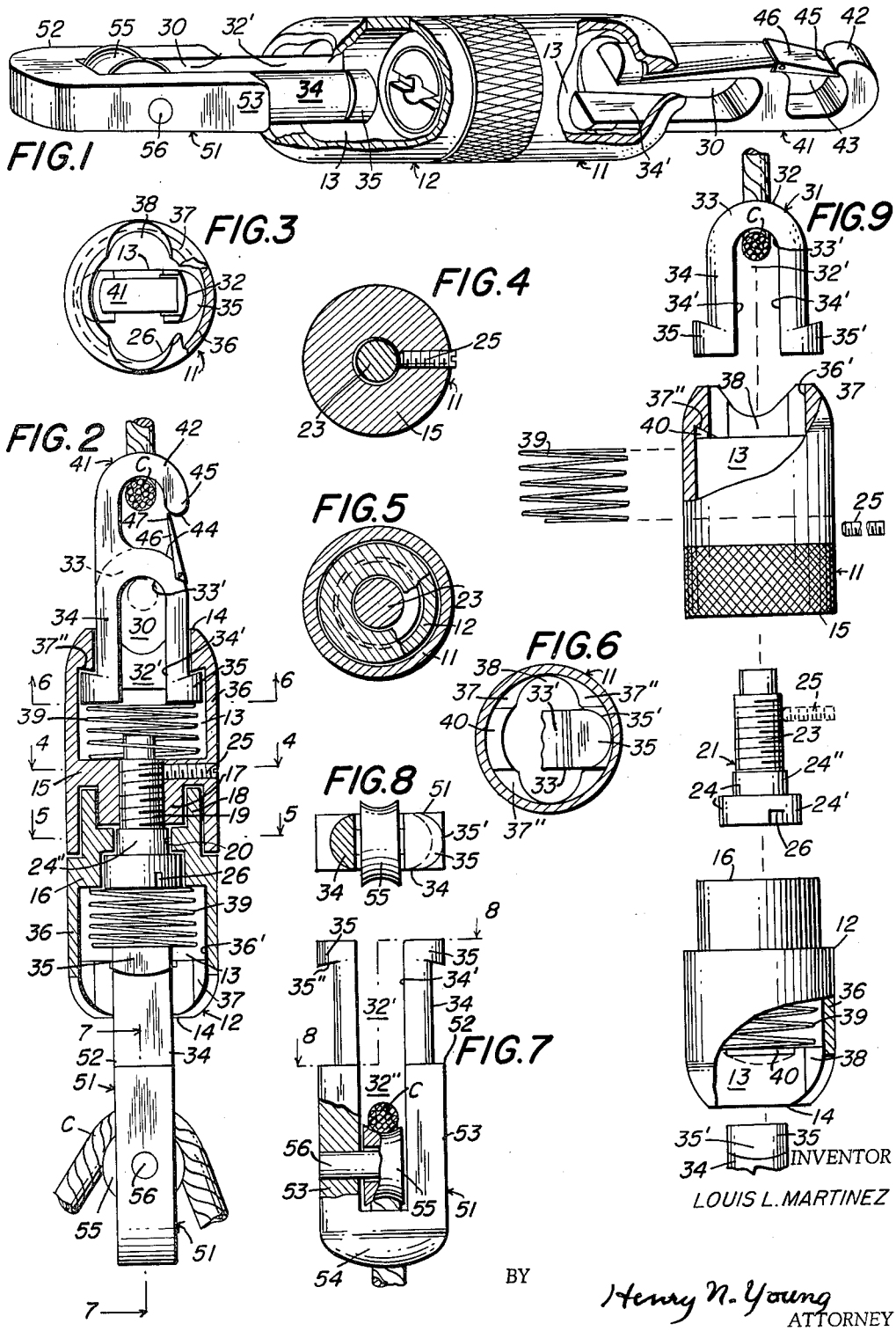
INVENTOR
LOUIS L. MARTINEZ
BY Henry N. Young
ATTORNEY United States Patent Office 3,234,615
Patented Feb. 15, 1966

3,234,615
TENSIONAL CONNECTOR
Louis L. Martinez, 4672 Bird Road, Oakland, Calif.
Filed Feb. 25, 1963, Ser. No. 260,520
3 Claims. (Cl. 24—221)

The invention relates to units which are particularly adapted for their facilitated interposition as connecting tension elements in pull or draft lines.

The features of present invention are disclosed in unitary connectors of the swivel type adapted for their interposed working installation in tension between connected elements with which at least one detachable terminal coupling member of the swivel assembly is releasably engageable in a manner to provide a generally universal draft connection between the connected elements while the coupling is operative.

An object of the invention is to provide a tensionally operative connector of the character described having a coupling member thereof arranged for direct engagement with an element to be attached to the connector and releasably and independently interlockable with an engaged connector portion thereof in a manner to prevent an accidental disconnection of the coupling member from the connector.

Another object of the invention is to provide a swivel connector of the character described having a coupling member thereof arranged for direct engagement with an element to be attached to the swivel and releasably and independently interlockable with an engaged swivel portion in a manner to prevent an accidental disconnection of the coupling member from the engaged swivel portion.

A further object is to provide a connector of the character described having a coupling member thereof adapted for its direct operative engagement through an eye or bight of an element to be connected to a swivel portion with which it is cooperative, when installed, to provide an effectively closed eye transversely receiving the eye or bight of the connected element.

A more specific object is to provide a swivel connector having a quick-release coupling means thereof adapted for its direct engagement with an eye or bight of an element to be connected to a swivel portion in releasably interlocked relation to the portion.

An added object is to provide a swivel connector of the character described provided with coupling members for engaging elements to be connected and arranged for their mutually independent and releasably interlocked engagement with the different swivel parts in a manner to permit an independent release of the coupling member from either engaged swivel part.

A general object is to provide a particularly simple and compact connector assembly of the character described.

The invention possesses other objects and features of advantage, some of which, with the foregoing, will be set forth or be apparent in the following description of typical embodiments thereof, and in the accompanying drawings, in which, FIGURE 1 is a perspective view of a present swivel connector assembly horizontally disposed and having certain parts thereof broken away or omitted.

FIGURE 2 is a longitudinal view of the assembly of FIGURE 1 having the swivel body thereof shown in upright position and in axial section.

FIGURE 3 is a partly sectional top view of the assembly of FIGURE 2.

FIGURE 4 is a section taken at the line 4—4 in FIGURE 2.

FIGURE 5 is a section taken at the line 5—5 in FIGURE 2.

FIGURE 6 is a partly broken-away view taken from the line 6—6 in FIGURE 2.

FIGURE 7 is a broken-away side face view of a coupling member of FIGURE 2.

FIGURE 8 is a partly sectional view taken from the broken line 8—8 in FIGURE 7.

FIGURE 9 is an exploded view of the members of the assembly of FIGURE 2, with certain of said members shown in partial section.

As illustrated, the features of my invention are embodied in a swivel assembly provided by a two-piece body having coaxially related members 11 and 12 of generally cylindrical outline unitarily connected in coaxially swiveled relation for similarly and releasably retaining corresponding inner portions of various connecting members in like-shaped socket spaces 13 which extend from like convexedly rounded outer end faces 14 of the body members 11 and 12. Preferably, and as shown, the mutually opposed and generally closed inner ends 15 and 16 of the respective members 11 and 12 are complementarily interfitted for their maintained relative rotation about their common axis, with the end 15 of the member 11 providing a coaxial annular recess 17 which complementarily and closely receives a tubular extension 18 of the end 16 of the member 12. For providing a swiveled relation of the members 11 and 12, corresponding opposed inner end portions 15 and 16 of the present members 11 and 12 are respectively provided with coaxial bores 19 and 20 with which appropriate parts of a suitable unitary swivel pin or bolt 21 are cooperatively engaged for its operation in tension between the members while permitting a relative swiveled rotation of the connected body members 11 and 12 for preventing an axial separation of the members.

As particularly shown, the bore 19 of the member 11 is threaded for the set engagement therein of a complementarily threaded shank portion 23 of the pin 21. At its other end, the pin 21 has an unthreaded terminal head portion 24 which is intermediately stepped inwardly from a terminal cylindrical part 24′ to a smaller pin head part 24″ which is cooperative with the head part 24′ to provide a shoulder for engaging an opposed flat annular and radial seat in the complementary axial bore 20 provided through the end 16 of the member 12 to appropriately space the opposed flat faces of the member ends 15 and 16 in the present swivel connection of the members by and about the installed pin 21. As shown, the outer end face of the part 24′ of the pin head 24 is provided with a cross-slot 16, or other recess, for the application therein, from the open end of its socket 13, of the bit of a screw-driver or other turning tool (not shown) for use in longitudinally adjusting the pin 21 by turning it in its mounted relation in the threaded bore 19 of the member 11, and a setscrew 25 engaged radially in the end portion 15 of the socket member 11 is operative against the pin shank 23 in the bore 19 for maintaining a set engagement of the pin shank in said bore.

Noting that the present unitary combination of the members 11 and 12 with the connecting pin 21 essentially comprises a swivel unit which is operative through said pin 21 to provide a tensional connection between different elements which are attached to the swivel members 11 and 12, the present said members are arranged for the direct and releasable attachment thereto of coupling or connector members which are particularly designed for appropriately attaching different elements to the swivel members 11 and 12 for connecting the elements through the swivel assembly, whereby pull or draft connections for the connected elements may be provided through the cooperative coupling members and the connecting swivel unit. Advantageously, and as disclosed, various coupling members for use with the present swivel unit may all have the same means thereof for releasably attaching them to the swivel members 11 and 12 at socket-engaging parts thereof for their cooperation with the mutually outer ends 14 of the members 11 and 12 to define closed element-attaching eye openings 30 for use in connecting a present swivel unit, or the like, with and between elements to be connected.

As particularly shown in FIGURE 9, a coupling member 31 of a basic form for its releasably secured engagement as a tensionally acting strain member between a swivel member 11 or 12 and a tension element to be attached thereto, comprises a generally U-shaped body 32 having a head portion 33 integrally connecting spaced arms or prongs 34 which are of mutually complementary form, have mutually parallel and flat opposed inner faces 34' connected by an outwardly arched inner face 33' provided by the head portion 33 to cooperatively define a body space 32', and are provided with mutually outturned terminal anchoring lugs 35 by which they are releasably retainable within like socket spaces 13 which are bounded by closed cylindrical walls 36 having bores 36' of uniform cylindrical diameter axially inwardly of flanges 37 which extend radially inwardly at the outer socket ends 14. The inner edges of the flanges 37 are cut away to provide diametrically opposed notches 38 of like and axially uniform crescent section slightly exceeding the sections of the lugs 35 of a coupling member 31 to provide for a free axial movement of the lugs through the flange edge notches 38 into or from the socket space 13 of the member.

When a coupling member 31 having the described means for attaching it to a swivel member 11 or 12 within its socket 13, has its anchoring arms 34 inserted within a socket space through the axial flange notches 38 at its open end, a subsequent rotation of the member to dispose its lugs 35 out of axial alignment with the notches 38 for disposing the lugs of the member 31 in opposition to the axially inner faces 37' of the unnotched flange portions will then prevent an axial removal of the installed member 31 with respect to the receiving socket member unless and until the lugs 35 are realigned with the notches 38. Preferably, and as shown, the side faces 35' of the anchoring lugs 35 extend outwardly from the opposed flat faces 34' of the coupling arms 34 and have their outer face portions cylindrically curved with a radius slightly less than that of the socket bore 36'. Also, the opposed axially directed lug and flange faces 35" and 37" respectively are preferably conically tapered to like degrees toward the swivel axis and the bottom of the socket.

When a socket space 13 is unoccupied by the arms 34 of a coupling member 31, helical compression springs 39 having appropriate end diameters are normally engaged and held in a slightly compressed condition between the mutually coplanar inner faces 37' of the unnotched portions of the flange 37 and the bottom end of the socket as is shown in FIGURE 9 with reference to the socket space 13 of the swivel member 12. When, however, an inserted coupling member 31, or the like, is sufficiently and manually pressed axially inwardly in a socket space 13 against the resistance of the engaged spring 39 to permit a rotation of the member to dispose the lugs 35 opposite the flange face portions 37" and is so rotated, a release of the installing pressure will cooperatively engage said complementarily tapered lug and flange faces 35" and 37" for frictionally retaining an engaged member 31 or the like against axial disengagement from the mounting swivel section under normal use conditions. As indicated in FIGURES 6 and 9, the flange face portions 37" are preferably intermediately and radially recessed at 40 to complementarily receive the terminal parts of the arm lugs 35 providing the end faces 35" for further preventing a mutual release of the section and member by reason of an unintended inward axial displacement of a coupling member installed in the socket 13 of a member 11 or 12.

It will now be noted that FIGURES 1 and 2 and 3 disclose the mounted application with respect to the socket 13 of the socket-providing member 11 of a coupling member 41 including the basic attaching structure of the coupling member 31 and comprising the arms 34 providing the terminal anchoring lugs 35 and connected by an arcuate head portion 33 to define the space 32' and to which has been axially added an arcuate hook portion 42 extending integrally from and beyond the head portion 33 in the plane of the arms 34, with the space 43 of the hook having a side access gap 44 between the head portion 33 and the hook point 45. As shown, the head 33 of the coupling member 41 mounts a spring-loaded latch arm 46 having its free point 47 normally engaged with the inner side of the hook point 45 through the action of a suitable spring, whereby an inward displacement of the arm 46 provides for a movement of an entered portion of a tension cable C or the like laterally thereof into or from the hook space 43 through the access opening 44 therefor before or while this coupling member 41 is mounted in the swivel socket 13.

FIGURES 1 and 2 and 7 and 8 disclose the mounted application with respect to the socket 13 of the socket-providing swivel member 12 of a coupling member 51 including the basic attaching structure of the coupling member 31 comprising the arms 34 as integrally connected by an aligned U-shaped head portion 52 having parallel side portions 53 connected by an end portion 54 replacing the arcuate head portion 33 of the coupling members 31 and 51 and providing therein a continuation 32" of the space 32'. The head portion 52 of the present coupling member 51 has the same transverse thickness as its mutually coplanar arms 34 and rotatably mounts a sheave 55 within its space 32" adjacent its ends 54 for rotation about an axle pin 56 which is mounted in and between the sides 53 of the head portion 52 to provide for the engagement of a bight or terminal eye of a cable C or the like between it and the space 32' between the anchoring arms 34 of the present coupling 51. In the event, however, that the cable C is flexible enough, the head portion 54 at the closed end of the space 32" may have rounded edges to facilitate a direct running engagement of a cable C therethrough in lieu of providing and utilizing the sheave 55.

It will now be generally noted that when the arms 34 of a coupling member 31 or 41 or 51, which define the space 32' between them, are engaged and secured by the described means in either of the like socket spaces 13 of a present swivel assembly, a portion of the space 32 defined between the arms extends beyond the end face 14 of the receiving socket 13 whereby the end faces 33' of the members 12 or 13 are cooperative with the opposed said socket end face 14 to effectively define the peripherally closed eye openings 30 for releasably receiving an appropriate part of an element to be directly attached to the associated swivel member by the disclosed interlocked engagement of the installed coupling member in the like sockets 13 of either swivel member 11 or 12. Also, while the free end of a tension cable might be threadingly inserted in a laterally closed eye opening 30 provided in cooperation with the outer end of a swivel member 11 or 12 by an installed present or similar coupling member, it will generally be preferable to engage the cable, or the bight of a terminal eye thereof, transversely through the space 32' of a present coupling before the coupling is mounted on a swivel assembly in interlocked relation thereto for enclosing the received cable part in the defined eye opening 30.

In view of the foregoing description, it will be generally understood that the present coupling members 31 or 41 or 51 are particularly adapted for interposed use in connecting a swivel assembly in a draft or tension line in which like or different said couplings might operatively and releasably engage the like sockets 13 of either of the swivel members 11 or 12 in most advantageous combinations in a pull line. Furthermore, the stream-lined outline of a present connector, in which no body part or coupling element extends radially beyond the bounding cylinder of the body assembly defined by the present coaxial socket members 12 and 13 of like external diameter having convexedly rounded ends and the attached coupling members 41 or 51 with their smaller cylindrically rounded ends, is understood to generally prevent a lateral catching of the disclosed forms of the present connector with adjacent objects during working movements thereof, while adapting the connectors to such special uses as effecting the pulling of cables over the ground or through bodies of water, or drawing electrical conductor or other wires through installed conduits.

From the foregoing description taken in connection with the accompanying drawings, the advantages of the present tensional connectors will be readily understood by those skilled in the art to which the invention appertains. While I have shown and described structural arrangements which I now consider to comprise preferred embodiments of my invention, I desire to have it understood that the disclosures are primarily illustrative, that the connectors may be of different sizes and proportions to meet different use requirements, and that other changes and developments may be made, when desired, as fall within the scope of the following claims.

I claim:

1. In a tensional connector for operative interposition between load elements, a pair of cylindrical body members of similar outline providing sockets extending axially into the members from one end thereof, a tension means coactive between the other ends of said body members connecting them in coaxially swiveled relation, a coupling member releasably engaged and secured between a said socket of one body member and the corresponding load element and comprising a U-shaped body insertable axially in the socket of said socket body with the bight of its closed end extending beyond the mounting body member and retainedly connectable with a terminal portion of a tension line and having its arms retainedly engaged in said socket by an interlock means which is releasable by and upon a relative rotation of the engaged coupling member and socket-providing member, a spring-biased detent means normally cooperative between the body and coupling members to prevent their relative rotation for effecting a mutual release thereof, and a coupling means operative as the first coupling means for releasably connecting the other body member with the other load element.

2. In a connector for operative interposition as a tension connection between load elements, a body member providing a cylindrical socket extending into the body from an end thereof, a coupling member for connected interposition between said socket of the body and a portion of a said load element and comprising a rigid U-shaped body having its bight portion connecting coplanar arms of like uniform transverse thickness and adapted to retainedly receive and engage said portion of the load element transversely therethrough and having end portions of its arms provided with mutually outturned lugs for disposal in said socket, an inturned flange of the socket opening providing axially directed notches for simultaneously receiving said lugs of the coupling member arms inwardly therethrough for their disposal in said socket against and behind the unnotched flange portions in releasably interlocked relation thereto, with the bight of the socketed coupling member cooperative with the body of the connector about the open end of said socket to provide a laterally closed eye for retainedly receiving said portion of the load element against its removal from the eye transversely thereof, and a means for releasably connecting the other end of the body member with the other load element.

3. The combination of claim 2 having a spring-biased detent means normally cooperative between the interlocked body and coupling members to prevent their relative rotation for effecting a mutual release thereof.

References Cited by the Examiner

UNITED STATES PATENTS

| | | | |
|---|---|---|---|
| 195,400 | 9/1877 | Richard | 24—123 |
| 231,751 | 8/1880 | Bailey et al. | 24—124 |
| 821,216 | 5/1906 | Castera. | |
| 3,013,244 | 12/1961 | Rudy | 24—125 X |

FOREIGN PATENTS

| | | |
|---|---|---|
| 120,806 | 5/1901 | Germany. |
| 920 | 1902 | Great Britain. |

WILLIAM FELDMAN, *Primary Examiner.*

DONLEY J. STOCKING, *Examiner.*